United States Patent [19]
Chauvigne

[11] 3,957,244
[45] May 18, 1976

[54] VALVE
[75] Inventor: Michel Chauvigné, Cluses, France
[73] Assignee: Carpano & Pons S.A., France
[22] Filed: Oct. 29, 1974
[21] Appl. No.: 519,045

[30] Foreign Application Priority Data
Oct. 31, 1973 France .............. 73.38973

[52] U.S. Cl. .................. 251/30; 251/45
[51] Int. Cl.² .............. F16K 31/385; F16K 31/40
[58] Field of Search .............. 137/596.16; 251/30, 251/45

[56] References Cited
UNITED STATES PATENTS

| | | | |
|---|---|---|---|
| 1,595,755 | 8/1926 | Brooks et al. ............ | 251/30 X |
| 2,102,076 | 12/1937 | Johnson .................. | 251/30 |
| 3,282,552 | 11/1966 | Sommese, Sr. ........... | 251/30 X |

*Primary Examiner*—Arnold Rosenthal
*Attorney, Agent, or Firm*—Robert E. Burns; Emmanuel J. Lobato; Bruce L. Adams

[57] ABSTRACT

A valve includes a membrane carrying a clack, an inlet and an outlet of the valve facing one face of the membrane whereby the valve can be seated to close the outlet. A main or pilot operated chamber delimited by the other face of the membrane permanently communicates with the inlet via a first passage, and may communicate with the outlet via a second passage of greater cross-sectional area than the first. When the main valve is seated to close the valve, temporary opening of the second passage for example by an electromagnet reduces the pressure in the chamber and thus actuates opening of the valve and the valve. A third passage, of greater cross-sectional area than the first, and also communicating the chamber with the outlet, is opened in response to opening of the valve and is held open against the action of a biasing spring as long as liquid flows through the valve. If the throughflow drops, the valve closes the valve. The valve can also be closed by opening a fourth passage, of greater cross-sectional area than the third, communicating the inlet with the chamber.

5 Claims, 2 Drawing Figures

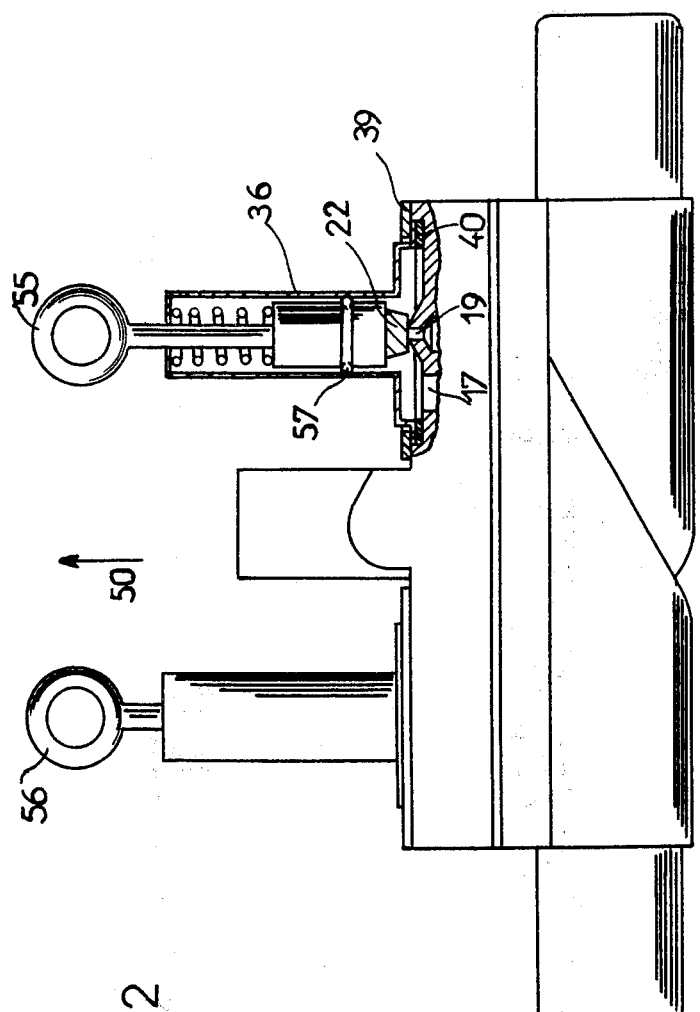

VALVE

BACKGROUND OF THE INVENTION

The invention concerns valves for controlling the flow of a liquid in a pipe, including a membrane supporting a first valve, an inlet communicating with a first face of the membrane, an outlet connected to a seat of the first valve facing said first face of the membrane, the second face of the membrane delimiting a chamber which communicates constantly with the inlet by a first passage and which is able to communicate with the outlet by a second passage of greater cross-sectional area than the first passage, and a second valve controlling opening of said second passage.

In known valves of this type, such as that described in the First Certificate of Addition No. 72,694 to French Pat. No. 1.186,275, the first valve can only be held in the open position by the action of the second valve which itself is constantly held in the open position, for example by a permanently energized electromagnet. The principal drawback of such a valve resides in the fact that as the electromagnet must be permanently energized any cut-off of the electric current interrupts the flow of liquid through the valve.

SUMMARY OF THE INVENTION

The invention aims to provide a pilot operated valve in which the stated drawback is avoided, by arranging for the actuation of the first valve to open the valve in response to an actuation of the second valve to temporarily open the second passage, and so that the valve will then remain open as long as there is a sufficient flow of liquid therethrough. Thus, when the second valve is actuated by an electromagnet, an accidental cut-off of the electric current does not interrupt the flow of liquid in the valve.

A valve according to the invention includes, in addition to the aforementioned two valves and two passages, a third valve kinematically connected to the first valve, and a spring biasing the third valve to close (at the same time as the first valve is seated) a third passage which communicates the chamber with the outlet. The cross-sectional area of the third passage is greater than that of the first passage. The valve also includes means for moving the second valve to temporarily open the second passage; these means may for example be formed by an electromagnet or a hydraulic circuit, or may be manually actuable.

An advantage of the valve according to the invention resides in the fact that a stoppage in the flow of liquid, up or downstream of the valve, causes closure thereof. If the flow of liquid is later re-established, the valve remains closed. A new actuation of the second valve to temporarily open the second passage is thus necessary to re-open the first valve to re-establish the flow of liquid through the valve.

In one particular embodiment of valve according to the invention, voluntary closing of the first valve of the valve may be obtained by a temporary actuation of voluntary closure means on the valve itself. This embodiment includes a fourth passage which can communicate the chamber with the inlet, the cross-sectional area of this fourth nozzle being greater than that of the third nozzle. Temporary opening of the fourth passage is controlled by temporarily opening a fourth valve. This temporary opening of the fourth passage may for example be controlled by electromagnetic, hydraulic or manually actuable means.

BRIEF DESCRIPTION OF THE DRAWINGS

The accompanying drawings show, by way of example, an embodiment of a valve according to the invention, and a variation thereof. In the drawings :

FIG. 2 is an elevational view, partially in cross-section, of a variation of the same embodiment, this variation being manually controllable.

DESCRIPTION OF THE PREFERRED EMBODIMENTS

Figure 1:
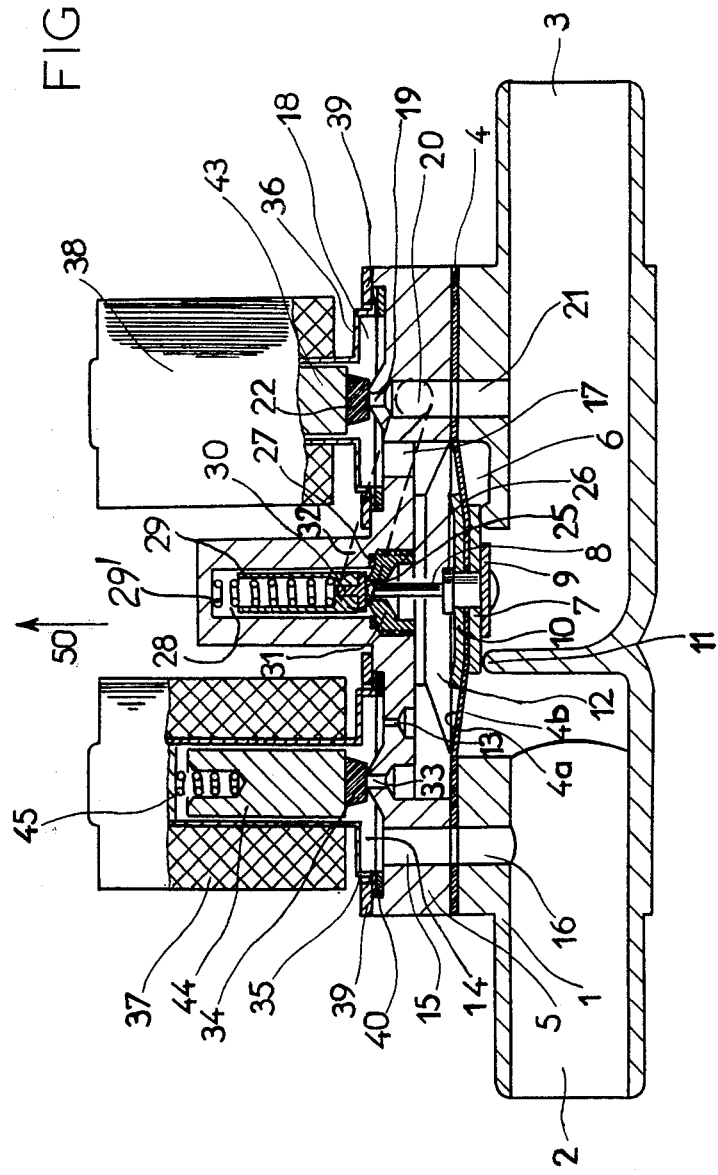
FIG. 1 is a cross-sectional view of an electromagnetically controlled valve.

As shown, the valve includes a body 1 in which are provided an inlet orifice 2 and an outlet orifice 3. A membrane 4 is held applied between the body 1 and a cover 5 by screws, not shown. The inlet orifice 2 communicates with a recess 6 provided in the body 1 facing face 4b of membrane 4. This membrane 4 supports a mobile first valve 7 which carries a push-rod 8 fixed thereon by two washers 9 and 10. The outlet orifice 3 is connected to a seat 11 disposed opposed to face 4b of the membrane, facing the mobile first valve 7 whereby the valve 7 is able to be seated against seat 11. A chamber 12 is provided in the cover 5 facing face 4a of membrane 4. This chamber 12 constantly communicates with the inlet orifice 2 via a first narrow passage 13, a chamber 14 and ducts 15 and 16. The chamber 12 is also able to communicate with the outlet orifice 3 by a duct 17, a chamber 18, a second narrow passage 19 and ducts 20 and 21; opening of the second passage 19 is controlled by a second valve 22. The cross-sectional area of this second passage 19 is greater than that of the first passage 13.

A third narrow passage 25, provided in a ferrule 26 screwed in cover 5, is disposed along the axis of rod 8. This ferrule 26 is screwed and jammed against a sealing joint 27 in a recess leading to a cylindrical housing 28 in which is slidably mounted, along the axis of rod 8, a push-piece 29 carrying a third valve 30. A spring 29' in housing 28 biases the push-piece 29 and the third valve 30 towards a seat 31 formed on the ferrule 26. The push-rod 8 passes through the third passage 25 and its length is such that when the first valve 7 is applied against its seat 11, and when the third valve 30 is applied against its seat 31, a small play is left between the end of push-rod 8 and the third valve 30. Moreover, the effective cross-sectional area of this third passage 25 (taking into account the push-piece 8 which passes through it) is greater than that of the first narrow passage 13. When the third valve 30 is open, the chamber 12 communicates with the outlet orifice 3 via the third passage 25, a duct 32 and ducts 20 and 21.

The chamber 12 is able to communicate with the inlet orifice 2 via a fourth narrow passage 33, chamber 14 and ducts 15 and 16. Opening of this fourth passage 33 is controlled by a fourth valve 34. The cross-sectional area of this fourth passage 33 is greater than that of the third passage 25.

Chambers 14 and 18 are formed by respective widened extremities of armatures 35 and 36 of electromagnets 37 and 38. These armatures are held applied against the cover 5 by washers 39, with sealing joints 40 interposed between the armatures and cover. valves 22 and 34 are supported respectively by adjustable cores 43 and 44 of the electromagnets, and are biased against their respective seats under the action of springs 45 when the electromagnets are not energized.

FIG. 1 shows the valve in the closed position, the inlet orifice 2 being filled with liquid under pressure. In this case, the recess 6 is also filled with liquid, as well as chamber 12 via ducts 16 and 15, chamber 14 and the first passage 13. The pressure of the liquid thus acts on the two faces 4a and 4b of the membrane; as the area of face 4a acted upon is greater than that of face 4b, the first valve 7 is held applied against its seat 11 by the pressure of the liquid. The valve thus remains in the closed position.

To open the valve, it suffices to temporarily energize electromagnet 38 to move its mobile core 43 as indicated by arrow 50. The second valve 22 opens, thus communicating chamber 12 with the outlet orifice 3 via the second passage 19. As this second passage 19 has a greater cross-sectional area than the first passage 13, the liquid flows from out of chamber 12 through the outlet orifice 3 faster than it flows from the inlet orifice 2 into chamber 12. The pressure in chamber 12 becomes less than that in the recess 6 and the valve 7 opens enabling the liquid to flow directly out of the outlet orifice 3 from the inlet orifice 2. As the same time, push-rod 8 abuts against and moves the third valve 30 in the direction of arrow 50. The valve 30 thus opens to bring the chamber 12 into communication with the outlet orifice 3 via the third passage 25. As this third passage 25 has a larger effective cross-sectional area than the first passage 13, the outflow of liquid through the third passage 25 keeps the pressure in chamber 12 lower than that in recess 6 and the valve remains open even if the second valve 22 is closed. It thus suffices to temporarily energize electromagnet 38 to make the valve remain in the open position. It is noted that for the valve to remain open, the difference in pressure between the chamber 12 and recess 6 (i.e. in the inlet and outlet orifices 2 and 3) must be sufficient to overcome the force exerted by spring 29'.

The valve thus remains open as long as the throughflow is sufficient to hold the first valve 7 open. If the flow is strongly reduced, as a result of an action up or downstream of the valve, the pressures in the valve tend to balance, enabling the membrane 4 to return to the position of FIG. 1 and the third valve 30 to close under the action of spring 29'. As the closing of valve 30 interrupts the flow of liquid from chamber 12 towards the outlet orifice 3, the pressure in chamber 12 increases and the first valve 7 carried by membrane 4 is strongly applied against its seat 11 and totally interrupts the flow of liquid out of the outlet orifice 3. The valve closes in the same manner if the flow up or downstream of the valve is totally interrupted.

If the action which caused the interruption of flow ceases, the valve remains closed; in effect, as the second and third passages 19 and 25 respectively are closed, the pressure exerted on the face 4a of membrane 4 always remains greater than that exerted on the face 4b.

To voluntarily close the valve, even at a moment when the flow therethrough is maximum, it suffices to temporarily energize the electromagnet 37 whose mobile core 44 moves in the direction of arrow 50, whereby the fourth valve 34 opens, communicating chamber 12 with the inlet orifice 2 via the fourth passage 33. As the fourth passage 33 has a greater cross-sectional area than the third passage 25 whose valve 30 is open at this moment, the liquid can penetrate from the inlet orifice 2 into chamber 12 faster than it can flow out of chamber 12 and through the outlet orifice 3 via the third passage 25. Because of this, the pressure in chamber 12 rises, moving the membrane 4 so that valve 7 comes to bear against its seat 11, thus interrupting the flow of liquid through the valve. Simultaneously the third clack 30 obturates the third passage 25 and the various elements are once more in the position shown in FIG. 1.

FIG. 2 shows a varied embodiment in which the two electromagnets are replaced by two mechanical devices which can be actuated by hand temporarily. Hence, the second and fourth clacks 22 and 34 respectively are supported by manually movable members in the form of pull-pieces 55 and 56 which perform the same functions as the electromagnets. The only difference in operation is that the electromagnets can be remote controlled whereas the pull-pieces must be actuated on the valve itself. A joint 57 ensures fluid-tightness.

The valve according to the invention may be used in many applications where it is desired to control the output of a liquid, for example in automatic or non-automatic spraying installations.

What is claimed is:

1. A valve comprising, means defining a fluid inlet and ,means defining a fluid outlet, a valve seat intermediate said inlet and said outlet providing communication therethrough between said inlet and said outlet, a flexible diaphragm having a valve element thereon seatable on said valve seat for closing communication between said inlet and said outlet in response to fluid pressure upstream of said diaphragm acting on said diaphragm in a direction for seating said valve element, means defining in conjunction with a face of said diaphragm a fluid chamber upstream of said valve seat, means defining a narrow first passageway from said fluid inlet to said fluid chamber constantly in communication with said fluid chamber to maintain fluid pressure therein for applying pressure to said diaphragm for seating said valve element on said valve seat, means defining a second passageway of greater transverse dimension than said first passageway and providing communication between said fluid chamber and said outlet, a separately operated first valve for opening and closing said second passageway and biased to a closed condition, means defining a third passageway from said fluid chamber to said outlet and of greater transverse dimension than said first passageway, a separately operated second valve for opening and closing said third passageway resiliantly biased to a closed condition, means for opening said second valve in response to the unseating of said valve element and closing said second valve when said valve element is seated, means defining a fourth passageway of greater transverse dimension than said third passageway and extending between the inlet and said fluid chamber, a separately operated third valve for opening and closing said fourth passageway and biased to a closed condition, and means to operate said first and third valves selectively and independently.

2. A valve according to claim 1, in which said first valve and said third valve comprise electromagnetically operated valves.

3. A valve according to claim 1, in which said means to operate said first and third valves comprises electromagnetic means.

4. A valve according to claim 1, in which said means to operate said first and third valves comprises manual means.

5. A valve according to claim 1, in which said means for opening said second valve in response to the unseating of said second valve comprises a valve stem on said valve element extending axially therefrom for lifting said second valve when said valve element is unseated and said diaphragm flexes a sufficient extent away from said valve seat.

* * * * *